R. H. ST. JOHN.
Watch Maker's Lathe.
No. 23,406.
Patented March 29, 1859.
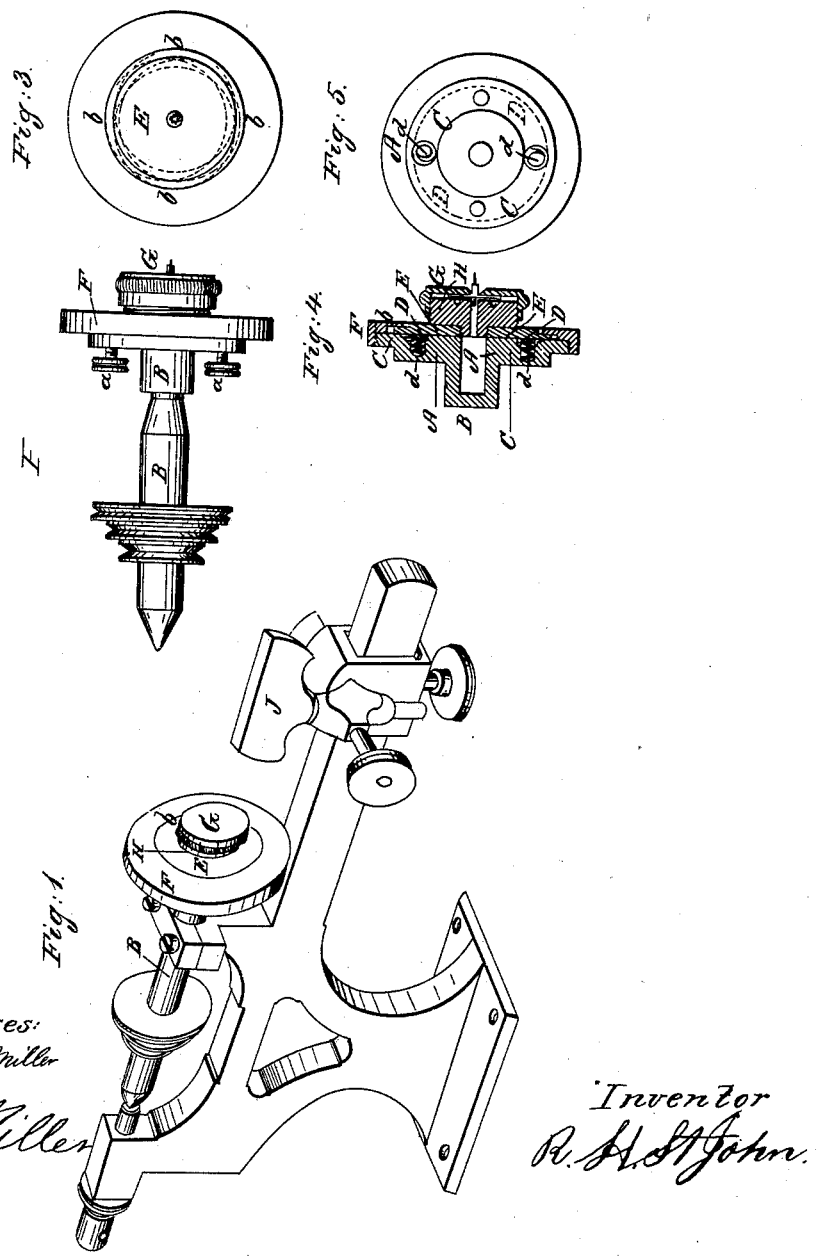
Witnesses:
William Miller
John Miller
Inventor
R. H. St John.

UNITED STATES PATENT OFFICE.

R. H. ST. JOHN, OF BELLEFONTAINE, OHIO.

WATCHMAKER'S LATHE.

Specification of Letters Patent No. 23,406, dated March 29, 1859.

*To all whom it may concern:*

Be it known that I, R. H. ST. JOHN, of Bellefontaine, Ohio, have invented certain new and useful Improvements on the patent granted to me the 15th day of September, 1857, for a Watchmaker's Lathe; and I do hereby declare that the following is a full, clear, and exact description of the same, reference being had to the annexed drawings, of which—

Figure 1 represents a perspective view of the lathe complete. Fig. 2 is a side view of the mandrel and chuck. Fig. 3 shows a front view of the chuck showing the centering plate in several positions. Fig. 4 is a longitudinal section through the chuck and, a part of the mandrel. Fig. 5 shows a front view of the disk plate A with the cap or ring, and centering plate removed, and also exhibits the steel ring in dotted lines.

The circular disk plate A is rigidly secured to the lathe mandrel B, and has an annular depression C in its face, into which fits a steel ring D. This ring is made to press against the centering plate E by the two small helical springs $d, d$, so as to keep it snug against the inner surface of the flange $b$ at the same time allowing the centering plate a free motion within the annular space of the cap or ring F which ring is screwed onto the disk plate A as shown in Fig. 4. Two tightening screws $a, a$ pass through the disk plate A and against the steel ring D and these press the ring against the centering plate E and secure it rigidly against said plate in order to "set the true center" after it has once been attained.

A cap G having a perforation through its center is screwed on to the projection H which projection is screwed to the centering plate E and has a hole passing through it to receive the center points. The screw cap G secures the center points in the chuck in the center of the centering plate E; the desired center is then obtained by simply loosening the steel ring D by unscrewing the thumb screws $a\ a$, which operation allows a free play to the centering plate E and by adjusting the slide rest J to the required position the article to be trued is arranged between the centering point, and sliding mandrel (not shown in the drawings) in the usual way, and by applying a suitable piece of wood against the side of the center point, as the chuck is made to revolve and regulating the pressure of the piece of wood, the true center may be readily found, at which point the thumb screws $a\ a$ are tightened, thus setting the centering plate E at the desired position.

What I claim as my invention and desire to secure by Letters Patent is—

1. The combination and arrangement of the steel ring (D) springs $(d, d)$ set screws $(a, a)$ and centering plate (E) substantially as herein described for the purposes set forth.

2. I also claim the employment of the screw cap (G) for clamping the article to be centered in the manner herein specified.

In testimony of which invention I have hereunto set my hand in presence of witnesses.

R. H. ST. JOHN.

Witnesses:
WILLIAM MILLER,
JOHN MILLER.